(12) United States Patent
Miron et al.

(10) Patent No.: US 9,855,912 B2
(45) Date of Patent: Jan. 2, 2018

(54) AIRBAG

(71) Applicant: Dalphi Metal Espana S.A., Vigo (ES)

(72) Inventors: Francisco Miron, Caceres (ES); Alfonso Bustos Garcia, Boecillo Valladolid (ES)

(73) Assignee: Dalphi Metal Espana S.A. (ES)

( * ) Notice: Subject to any disclaimer, the term of this patent is extended or adjusted under 35 U.S.C. 154(b) by 0 days.

(21) Appl. No.: 15/181,451

(22) Filed: Jun. 14, 2016

(65) Prior Publication Data

US 2016/0288763 A1 Oct. 6, 2016

Related U.S. Application Data

(62) Division of application No. 14/625,730, filed on Feb. 19, 2015, now Pat. No. 9,393,925.

(30) Foreign Application Priority Data

Feb. 20, 2014 (EP) .................................. 14000605

(51) Int. Cl.
*B60R 21/2338* (2011.01)
*B60R 21/013* (2006.01)
*B60R 21/01* (2006.01)

(52) U.S. Cl.
CPC ........ *B60R 21/2338* (2013.01); *B60R 21/013* (2013.01); *B60R 2021/01238* (2013.01); *B60R 2021/01286* (2013.01); *B60R 2021/01315* (2013.01); *B60R 2021/23382* (2013.01); *B60R 2021/23384* (2013.01)

(58) Field of Classification Search
CPC ...... B60R 21/2338; B60R 2021/23382; B60R 2021/23384
See application file for complete search history.

(56) References Cited

U.S. PATENT DOCUMENTS

| 3,879,056 | A | 4/1975 | Kawashima |
|---|---|---|---|
| 5,452,915 | A | 9/1995 | Fredin |
| 5,607,183 | A | 3/1997 | Nishimura |
| 5,887,894 | A | 3/1999 | Castagner |
| 6,241,282 | B1 | 6/2001 | Specht |
| 6,254,130 | B1 | 7/2001 | Jayaraman |
| 6,616,184 | B2 | 9/2003 | Fischer |
| 6,722,691 | B1 | 4/2004 | Hangland |
| 7,152,875 | B2 | 12/2006 | Kai |
| 7,195,281 | B2 | 3/2007 | Williams et al. |
| 7,377,548 | B2 | 5/2008 | Bauer |
| 7,506,892 | B2 | 3/2009 | Klinkenberger |

(Continued)

*Primary Examiner* — Ruth Ilan
(74) *Attorney, Agent, or Firm* — Tarolli, Sundheim, Covell & Tummino LLP

(57) ABSTRACT

The present invention provides an airbag module (1) in particular for a front passenger (21, 23) of a vehicle, comprising an inflatable bag (3) having at least a first outer panel (33) and a second outer panel (35) arranged substantially symmetrically to each other with regard to a vertical middle plane (M) of the inflated bag. The airbag is characterised in that the inflatable bag (3) comprises a strap structure (5) substantially located between the first and second outer panels (33, 35), wherein the strap structure (5) is designed such that the bag is extendable from a first state having a first size to a second state having a second size depending on the size of the respective passenger and/or the kind of impact.

12 Claims, 3 Drawing Sheets

(56) References Cited

U.S. PATENT DOCUMENTS

| | | |
|---|---|---|
| 7,793,976 B2 | 9/2010 | Kuroe |
| 7,793,978 B2 | 9/2010 | Vigeant |
| 7,850,203 B2 | 12/2010 | Niwa |
| 7,942,443 B2 | 5/2011 | Dennis |
| 7,950,694 B2 | 5/2011 | Kim |
| 7,980,593 B2 | 7/2011 | Kim |
| 8,141,900 B2 | 3/2012 | Yamazaki |
| 8,215,671 B2 | 7/2012 | Bergstrom |
| 8,226,119 B2 | 7/2012 | Dong |
| 8,353,525 B2 | 1/2013 | Parks |
| 8,408,585 B2 | 4/2013 | Paxton |
| 8,419,058 B2 | 4/2013 | Fischer |
| 8,727,375 B2 | 5/2014 | Suzuki |
| 9,022,422 B2 | 5/2015 | Nam |
| 2004/0090055 A1 | 5/2004 | Kassman et al. |
| 2006/0049618 A1 | 3/2006 | Bito |
| 2006/0237956 A1 | 10/2006 | Fellhauer |
| 2007/0205591 A1 | 9/2007 | Bito |
| 2008/0023943 A1 | 1/2008 | Kwon |
| 2010/0244417 A1 | 9/2010 | Yamazaki |
| 2012/0299278 A1 | 11/2012 | Fukawatase |
| 2014/0028006 A1* | 1/2014 | Webber ............... B60R 21/2338 280/743.2 |
| 2015/0239422 A1 | 8/2015 | Ishiguro |

\* cited by examiner

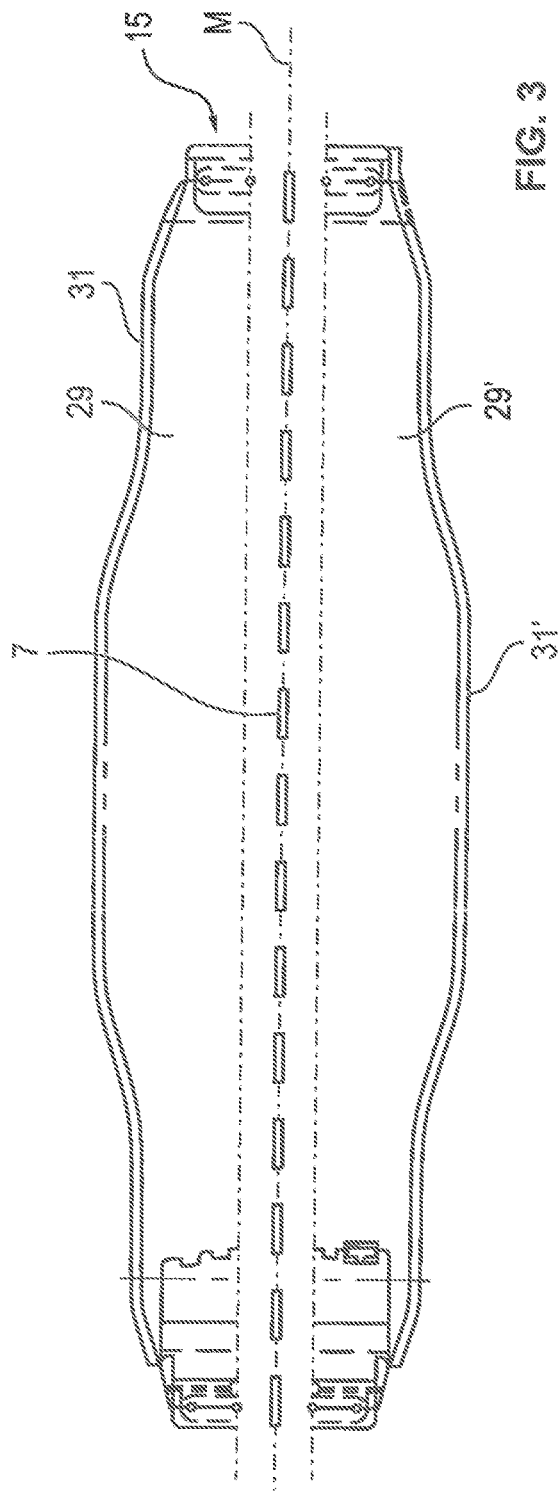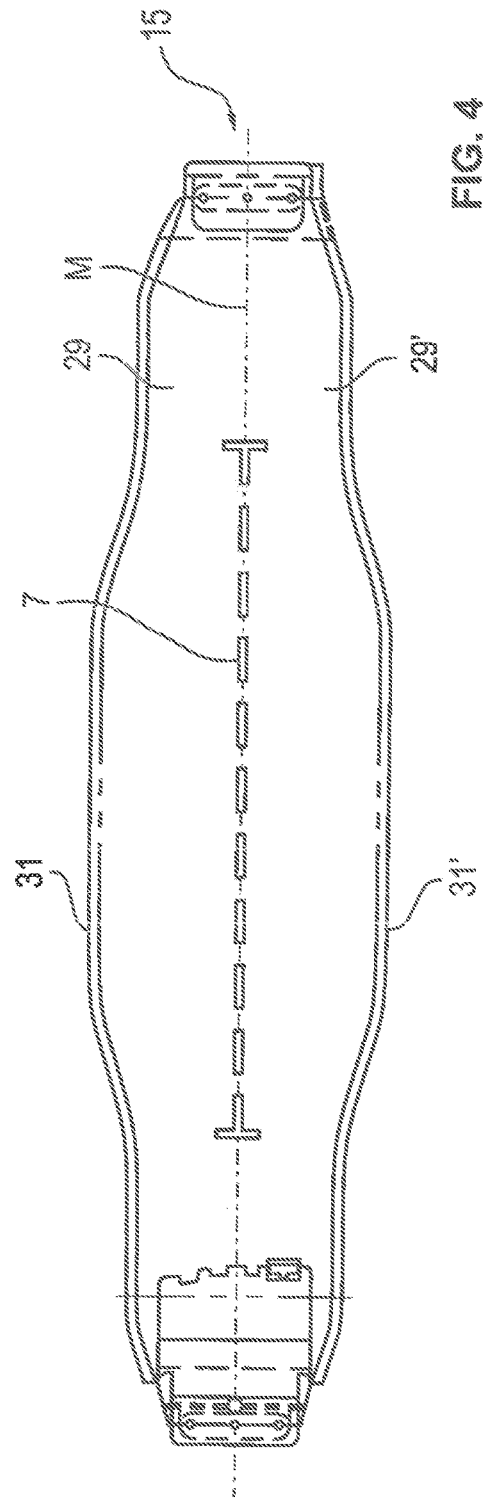

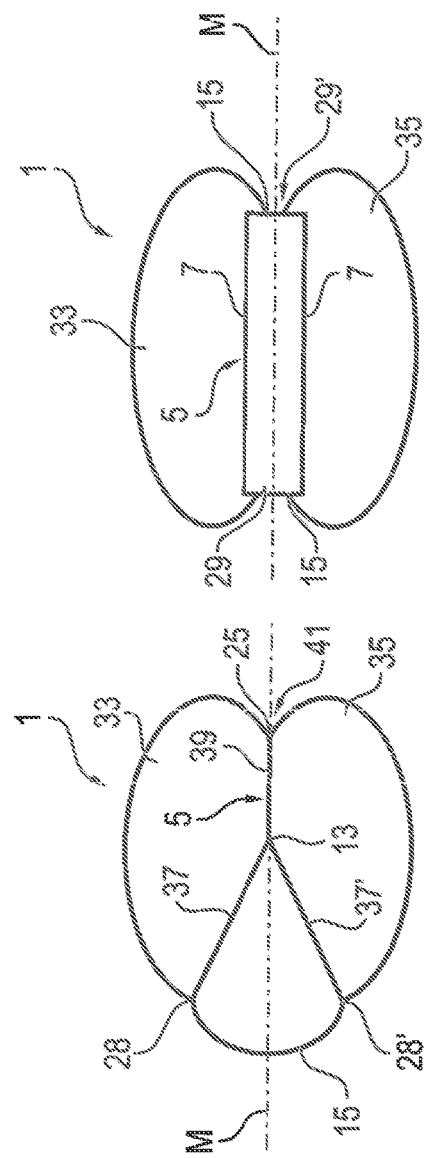
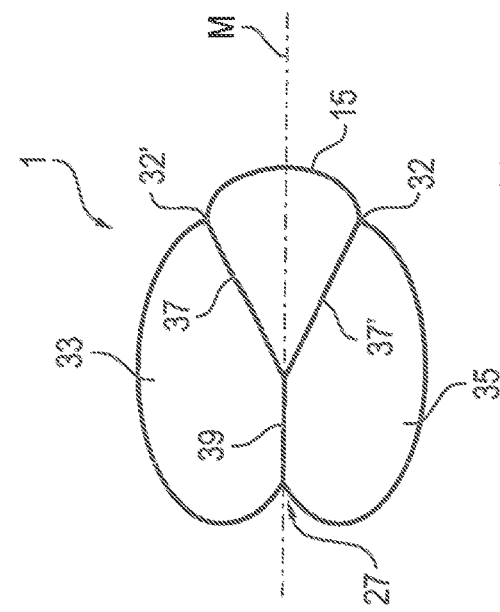
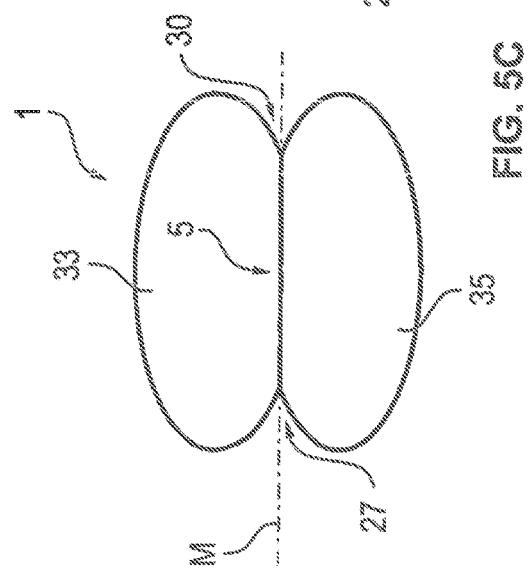

AIRBAG

RELATED APPLICATION

This application is a divisional of U.S. application Ser. No. 14/625,730, which was filed on Feb. 19, 2015, and which claims priority from European Patent Application No. 14000805.7, filed Feb. 20, 2014. The subject matter of these applications is hereby incorporated by reference.

BACKGROUND OF THE INVENTION

The present invention relates to an airbag module, in particular for a front passenger of a vehicle.

Airbags, in particular front passenger airbags are well known in the art. The conventional front passenger airbags have the disadvantage that they are only adjusted to a single average size of a front passenger. That is, the airbags are particularly not optimally designed for front passengers who are smaller than the average sized front passenger. In conclusion, certain of such front passenger airbags may have a non optimal efficiency in the event of an impact for passengers that are smaller than an average sized passenger.

SUMMARY OF THE INVENTION

It is therefore an object of the present invention to provide an airbag module, in particular a front passenger airbag module, for a vehicle, which provides an optimal efficiency for different sized occupants.

The airbag module is preferably a front passenger airbag for a vehicle, in particular for an automotive vehicle, comprising an inflatable bag having at least a first section of an outer panel and a second section of an outer panel, arranged substantially symmetrically to each other with regard to a vertical middle plane of the inflated bag. Furthermore, there may be a front panel arranged between the first and second sections of outer panels. According to the invention, the inflatable bag comprises a strap structure substantially arranged between the first and second sections of outer panels, wherein the strap structure is designed such that the bag is extendable from a first state having a first size to a second state having a second size depending on the size of the respective passenger and/or the severity of an impact.

Thus, it is an important aspect of the present invention that the geometrical shape and size of the bag may be adapted to the size of the passenger by means of an extendable bag in connection with an advantageous strap structure located between the first and second sections of outer panels of the bag. According to the invention, the strap structure is only released to reach the maximum geometry and volume of the bag, when the size of the occupant and/or the severity of an impact so require. That is, the size and shape, in particular the volume of the airbag may be dynamically adapted to an individual situation. In contrast to conventional airbags for front passengers, the airbag according to the present invention is thus suitable to be used in an optimal way with occupants of different sizes.

In a preferred embodiment of the airbag, each of the first and second sections of outer panels of the bag is formed by a separate first and second outer panel being connected, preferably by stitching, to become part of or form the bag. In an alternative embodiment, the first and second sections of outer panels of the bag are formed in one piece from a bag fabric material, preferably by laser-cutting, such that the joining by stitching is no longer necessary. Consequently, in this specification and claims, the terminology "first and second panels" should be read as "first and second sections of outer panels", too, depending on the respective actual embodiment.

In a preferred configuration of the airbag, the strap structure comprises a plurality of straps, which maybe in a ray-like manner attached to a common peripheral front panel of the bag. That is, the strap structure comprises a plurality of vertical and/or inclined straps, which are preferably integrally formed from a single piece of fabric. Furthermore, the number of required straps—or internal panel design—may differ depending on the individual field of application.

In a preferred embodiment of the invention, the straps are connected to the first and second outer panels, in particular via a front panel of the bag. For attaching the straps to the bag, the front panel may comprise one or more front panel parts, which are substantially identically shaped and arranged symmetrically to each other. The straps may be located in the seam area between the two front panel parts such that the straps may be attached to the front panel by sewing the two front panel parts together. In an alternative configuration, the straps may he attached to the bag by arranging them in a seam area between the first and second outer panels.

In order to provide an evenly distributed tension across the bag, the straps are preferably attached to the hag and particularly to the front panel by means of a continuous seam, which extends over the distal ends of each of the straps. Preferably, the ray-like arrangement of the straps in the vertical middle plane of the bag is such that the straps are distributed in an optimum operation angle. Thereby, the straps include an angle with each other and lie in a plane, which substantially corresponds to the vertical middle plane of the bag. Furthermore, the straps may have an appropriate cutting geometry at their distal end, such that the tension may be evenly distributed over the bag. Thus, the straps may become broader towards their distal ends.

In order to provide the extension of the bag from a first volume to a second bigger volume, the straps of the strap structure preferably comprise a predetermined breaking point, such that the straps will break upon applying a predetermined traction force to it. The traction force may be actively or passively applied to the strap structure. For example, in the case of a passive release of the straps, the straps are broken by traction at predetermined areas (breaking points), which may result from an overpressure in the bag. The overpressure in the bag may be initiated in the event that a smaller passenger on the front passenger seat or a severe collision is detected by respective sensors. For implementing a passive activation/release of the straps, the airbag may be associated with at least two gas generators (inflators). On the other hand, an active release mechanism may be located directly on the straps. In this case, an actuator mechanism, for example a pyrotechnical actuator mechanism or the like, may be provided. Thus, the active mechanism is preferably electrically controlled and activated.

In the first state of the bag, the volume of the airbag is smaller than in the second state of the bag, because the straps retain the bag and thus form a necking zone extending substantially in the vertical middle plane of the bag. In a horizontal cross-sectional view, the airbag thus preferably develops a heart-shape. Furthermore, the airbag preferably comprises a single chamber, which cooperates with at least one inflator to deploy the bag.

In a further preferred embodiment of the invention, the strap structure may substantially be Y-shaped in a horizontal cross sectional consideration of the deployed bag. In this configuration, a first outer periphery of the strap structure is attached to a seam area between the first outer panel and the front panel and a second outer periphery of the strap structure is attached to the seam area between the second outer panel and the front panel. Owing to this configuration, two necking zones will result, which face a front occupant in an installed configuration of the airbag, and which ensure a reduced volume of the inflatable bag in the first stats of the bag. Only in the second state, the bag will have its maximum deployable size and shape.

A further preferred embodiment of the invention provides an airbag with a strap structure, which comprises two parallel layers of straps 7, wherein the distal and proximal ends of the straps are attached to the first and second outer panels and/or to a common front panel.

In order to solve the above object, the present invention also provides a vehicle safety system, in particular for improving the protection of an occupant, comprising an inflator (13) and an bag (3) inflatable by said inflator (13) as part of an airbag module (1), and an electronic control unit, by means of which the inflator (13) can be activated at recognition of an activation situation.

In order to solve the above object, the present invention also provides a vehicle, in particular an automotive vehicle, including an airbag module, preferably a front passenger airbag module, according to the invention.

BRIEF DESCRIPTION OF THE DRAWINGS

The invention is in the following described by means of the drawings, which are as follows:

FIG. 3 A schematic front view of a strap structure, in an assembling state;

FIG. 4 A schematic front view of a strap structure, in an assembled state;

FIGS. 5A-5D Schematic cross-sectional views of further embodiments of a strap structure according to the invention.

DESCRIPTION

Figure 1:
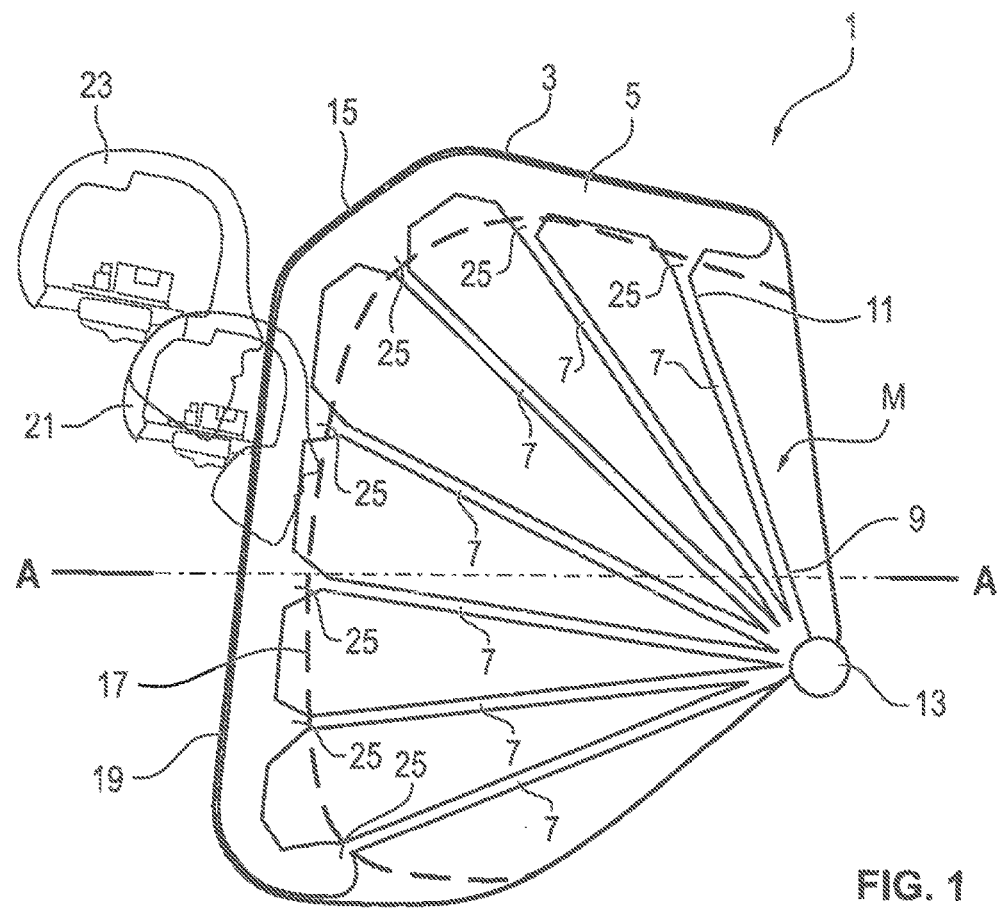
FIG. 1 A schematic vertical cross-sectional view of the strap structure according to the present invention.

FIG. 1 shows a schematic cross-sectional view of a vertical middle plane M of an airbag 1 according to the present invention. The middle plane M substantially extends in a vertical direction when the airbag is integrated in a vehicle. The airbag 1 comprises an inflatable bag 3, which is illustrated in an inflated state in FIG. 1. The airbag 1 further comprises a strap structure 5, which in the present example comprises seven straps 7. The straps 7 are substantially flat and extend in the vertical middle plane M. Furthermore, the straps 7 are arranged in a ray-like manner and thus, each of the straps 7 includes an angle with the other straps 7. In alternative embodiments, the straps could be embodied by tethers or a perforated internal panel with honey-comb holes.

Each strap 7 comprises a proximal end 9 and a distal end 11 wherein the proximal ends 9 of the straps 7 are connected in a common connection area 13, which is preferably located close to the inflator (gas generator) of the airbag 1 and thus faces away from a front passenger in the vehicle. The opposite distal ends 11 of the straps 7 are connected to a common front panel 15, which forms part of the bag 3 and faces a front passenger in an installed state. Preferably, the strap structure 5 comprising the straps 7 is integrally formed from one piece of fabric, wherein the ray-like pattern of the straps may result from a suitable cutting procedure of a piece of fabric. In particular, the ray-like strap structure 5 may be manufactured by means of a laser cutting or a similar suitable procedure.

The strap structure 5 of FIG. 1 is designed such that the bag is extendable starting from a first state, which is indicated in FIG. 1 with the dotted line 17. In this first state, the airbag comprises a reduced volume, since the front panel 15 is retained in the plane indicated by the line 17. The bag 3 is extendable to a second state indicated by the continuous line 19. In this state, the bag 3 deploys to its maximum size (volume) and shape.

As can be seen from FIG. 1, a first smaller passenger 21 is optimally protected by a bag 3, which is in the first state as indicated by the dotted line 17, wherein a second passenger bigger than the first passenger 21 is optimally protected by a bag 3, which is inflated in the second state of the bag 3 indicated by the continuous line 19.

In order to allow for an extension of the bag 3 from the first state to the second enlarged state of the bag 3, the straps 7 preferably are passively or actively releasable from the inner walls of the bag 3 and in particular from the front panel 15. In other words, the retaining connection between the bag 3 and the strap structure 5 may be out by means of a suitable mechanism. For releasing the straps from the front panel 15, they may each comprise a breaking point 25, which may be arranged in the plane indicated by the dotted line 17 or on any other portion of the strap 7. Thus, if for example an intentional overpressure is generated in the bag 3, a traction force will be applied on the straps 7, such that the straps 7 will break at the predetermined breaking points 25 and the bag 3 is thus able to further deploy from the first state to the second state indicated by the continuous line 19.

In an alternative embodiment the straps or panel could be also be made releasesable from or at their interface side close to the inflator 13.

On the other hand, an active mechanism for transferring the bag 3 and the straps 5 from the retaining first state to the fully deployed second state may comprise an active mechanism directly attached to the strap structure 5 and in particular to each of the straps 7. Such an active mechanism may for example comprise a pyrotechnic arrangement attached to the straps 7.

Figure 2:
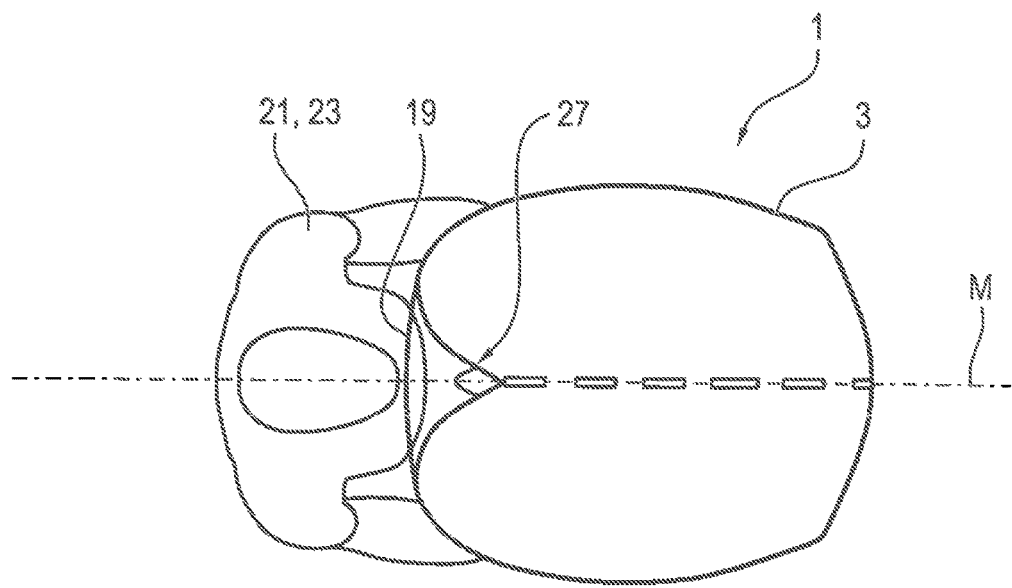
FIG. 2 A schematic horizontal cross-sectional view of an airbag arrangement of the present invention.

FIG. 2 shows a schematic horizontal cross-sectional view along the cutting line A-A indicated in FIG. 1. As can be seen from FIG. 2, the strap structure 5 with the ray-like arranged straps 7 result in the first state having the first (reduced) size of the bag 3 in a necking zone 27, in which the bag 3 has a reduced diameter in the vertical middle plane M of the airbag 1. As can further be seen from FIG. 2, in the second state of the bag 3 the straps 7 have been separated from the front panel 15 and thus, the necking zone 27 no longer exists. Consequently, the airbag 1 fully deploys to its final maximum size and shape as indicated by the continuous line 19 in FIG. 2. Thus, in the first state of the bag 3, where the straps 7 are still connected to the front panel 15, the cross-sectional shape of the bag 3 is heart-shaped.

FIGS. 3 and 4 show schematical front views of the front panel 15 in an assembling and in an assembled state. In the illustrated embodiment, the front panel 15 comprises two substantially symmetrically arranged front panel parts 29 and 29'. The front panel parts 29 and 29' are joined together preferably by a conventional seam, which may be silicon-coated or not. When seaming the two front panel parts together, the distal ends 11 of the straps 7 are arranged between the two front panel parts 29 and 29' and thereby fixedly connected to the front panel 15 (see FIG. 4). Alternatively, the front panel 29, 29! could be made of one single piece of fabric.

For assembling the airbag 1, the front panels 29 and 29' may be connected to first and second outer panels that are substantially arranged symmetrically with regard to the vertical middle plane M. Thus, a first outer panel may be connected to the lateral wall 31 of the front panel 29, wherein a lateral wall 31' of front panel 29' may be connected, in particular sewn, to a second outer panel for forming the airbag 1.

FIGS. 5A-5D show four further embodiments of an airbag 1 according to the present invention. In the embodiments shown in FIGS. 5A-5D the design of the strap structure 5 is different from the one shown in FIG. 1. More specifically, FIG. 5A shows a substantially Y-shaped form of the strap structure 5 with regard to a horizontal cross-sectional view of the airbag 1, wherein the horizontal cross-sectional view is substantially perpendicular to the vertical middle plane M.

As can be seen from FIG. 5A, the airbag 1 comprises a first outer panel 33 and a second outer panel 35, which are substantially symmetrically formed and arranged with regard to the vertical middle plane M. The strap structure 5 comprises in the illustrated embodiment two branches 37 and 37', which include an angle with each other and are connected to a common panel 39. Each of the branches 37, 37' and the panel 39 preferably comprises a plurality of straps 7 having a ray-like arrangement as illustrated in FIG. 1. Preferably, the branches 37, 37' are fixedly connected to the panel 39 or integrally formed therewith.

Furthermore, each of the branches 37, 37' is connected to the front panel 15, which is located between the two branches 37, 37'. Thus, a first outer periphery of the branch 37 is attached to a seam area of a first outer panel 33 and the front panel 15 and a second outer periphery of the branch 37' is attached to the seam area of a second outer panel 35 and the front panel 15 (preferably formed in one piece). Owing to this configuration, two necking zones 28, 28' result from retaining the bag 3 in the seam areas between the outer panels 33, 35 and the front panel 15.

In the embodiment of FIG. 5A, the airbag 1 is illustrated in a first state of the strap structure 5, wherein the bag 3 is retained by the straps 7 and thus, has a reduced volume. Preferably, the straps 7 located between the front panel 15 and the branches 37, 37' comprise breaking points 25, which break upon asserting a predetermined threshold force on the bag 3 and/or on the straps 7. Upon breaking of the straps 7, the airbag 1 will fully deploy to its final maximum size and shape. Preferably, also the panel 39 comprises a plurality of ray-like straps 7 to form a necking zone 41, where the distal ends of the panel 39 is connected to the first and second outer panels 33 and 35. As can be seen from FIG. 5A, the necking zone 41 is located on the opposite side of the necking zones 28, 28' and thus, facing away from a front passenger.

FIG. 5B shows a further embodiment of an airbag 1 according to the present invention. In this embodiment, the airbag 1 in the first state of the bag 3 comprises two necking zones 29 and 29', which are arranged on opposite sides of the bag 3. Thus, one necking zone 28 is facing the front passenger, whereas the other opposite necking zone 29' is facing away from the front passenger.

In this embodiment, the strap structure 5 has a substantially rectangular shape in a horizontal cross-sectional view of the airbag 1. In particular, the strap structure 5 preferably comprises two layers of ray-like straps 7, which are substantially arranged parallel to each other. The front panel 15 may be formed in one piece and connected with its lateral side feces to the two layers of ray-like arranged straps 7. In the embodiment of FIG. 5B, the straps 7 comprise suitable breaking points 25, in order to allow the bag 3 to deploy in the fully extended state upon asserting a predetermined threshold pressure on the strap 7.

FIG. 5C shows a further embodiment of the invention, which comprises a necking portion 27, and which substantially corresponds to the embodiment shown in FIGS. 1 and 2. However, in contrast to the embodiment of FIGS. 1 and 2, the bag 3 comprises an additional necking zone 30, which is located on an opposite side of the bag 3 and thus, facing away from a front passenger in the vehicle.

FIG. 5D shows a further embodiment of the invention, which substantially corresponds to the embodiment of FIG. 5A. However, in contrast to the embodiment of FIG. 5A, the single necking portion 27 is facing towards the front passenger in the installed state of the airbag 1. The opposing additional necking portions 32 and 32' are arranged adjacent to a front panel 15 and face away from the front passenger. In order to avoid repetitions, it is referred to the description with respect to FIG. 5A.

In conclusion, with a concept of vertical and/or inclined straps herein presented, it is possible to adapt the geometrical shape bag to the size of a passenger in the front area of a vehicle. The set of straps, i.e. the strap structure 5 remains affixed, thus creating a bag profile of lower depth in the vertical middle plane M. The straps 7 are only disconnected from the bag 3 to reach the maximum geometry and volume of the bag 3 required when the size of the passenger and/or the severity of the impact requires so.

In the case of a passive release of the straps, they are broken by traction at the predefined areas, for example due to an intentional predetermined overpressure in the bag. An active release of the straps requires an appropriate actuator mechanism, for example a pyrotechnical or other suitable actuator mechanism, which generally will be electronically controlled and activated. Preferably, the active mechanism to break the straps is directly located on the straps.

The fixation of the set of straps is preferably made directly to the front panel 15 in the vertical middle plane 15 by conventional sewing. The number of straps 7 required to acquire the desired results is not fixed and may vary depending on the respective application area. In order to ensure that the tension of the bag 3 at the abovementioned dotted line 17 and first state of the bag 3 is similar in all points, a continuous seam is used along the front panel 15. The strap structure 5 is cut such that the straps 7 are arranged at an optimum operation angle. The front panel 15 may in one embodiment of the invention consist of two vertical symmetrical parts, which will be joined together by e conventional seam and between which the set of straps will be housed.

In conclusion, the airbag according to the present invention provides for an optimal geometry of the bag for receiving the head and chest of both, big and small front passengers. Furthermore, a more homogeneous bag geometry is achieved, i.e. a bag geometry without the typical steps produced by the conventional horizontal straps in order to adapt the bag to other sizes of passengers and/or seating positions that could differ from the standard ones. The geometry of the bag is farther easily adjustable through simulation models and CAD tools. Additionally, an increase of available space for energy absorption (re-tension) of small passengers is achieved despite working with large bags having a volume of more than 140 l. The strap system may be formed in one piece cut by a laser and vertically sewn to the front panel and/or being Y-shaped and thus attached to the outer panels and the front panel. Furthermore, due to the necking zone(s) facing the passenger, the invention provides an additional protection in the event of front side or oblique impacts involving a passenger rotation towards the outside or inside of the vehicle. Finally, the airbag according to the present invention can easily be integrated in an airbag module and a vehicle.

LIST OF REFERENCE NUMERALS

1 Airbag Module
3 Bag
5 Strap structure
7 Straps
9 Proximal end
11 Distal end
13 Connection area
15 Front panel
17 Dotted line (first state)
19 Continuous line (second state)
21 First passenger
23 Second passenger
25 Breaking point
27, 27' Necking zone
28, 28' Necking zone
29, 29' Necking zone
30 Necking zone
31, 31' Lateral wall
33 First outer panel
35 Second outer panel
37, 37' Branches
39 Panel
41 Necking zone
M Middle plane

The invention claimed is:

1. Airbag module (1) for a front passenger (21, 23) of a vehicle, comprising:
an inflatable bag (3) having at least first and second outer panels (33, 35) arranged substantially symmetrically to each other with regard to a vertical middle plane (M) of the inflated bag,
wherein the inflatable bag (3) comprises a strap structure (5) located between the first and second outer panels (33, 35);
wherein the strap structure (5) is Y-shaped in a horizontal cross sectional view of the inflated bag (3), the strap structure comprising two branches (37, 37'), which include an angle with each other and are connected to a common panel (39), wherein each of the branches (37, 37') comprises a plurality of straps (7) having a ray-like arrangement; and
wherein the strap structure (5) is designed such that the bag is extendable from a first state having a first size to a second state having a second size depending on the size of the respective passenger and/or the severity of an impact.

2. Airbag module according to claim 1, wherein each of the straps (7) of the strap structure (5) comprises a predetermined breaking point (25), such that the straps (7) will break and/or detach from the bag (3) upon applying a predetermined traction force.

3. Airbag module according to claim 2, wherein the respective breaking point (25) is approximately in the middle of the strap (7).

4. Airbag module according to claim 1, wherein the straps (7) in the first state of the bag (3) result in a necking zone (27) between the first and second outer panels (33, 35).

5. Airbag module according to claim 1, wherein an outer periphery of the strap structure (5) substantially corresponds to a side periphery of the first and/or second outer panels (33, 35).

6. Airbag module according to claim 1, wherein distal ends (11) of the straps (7) are located in a seam area of a front panel (15).

7. Airbag module according to claim 1, wherein the straps (7) are attached to a front panel (15) by means of a continuous seam.

8. Airbag module according to claim 1, wherein the inflatable bag (3) comprises a single chamber, which cooperates with an inflator to deploy the bag.

9. Airbag module according to claim 1, wherein a first outer periphery of the strap structure is attached to a seam area of the first outer panel (33) and a front panel (15) and a second outer periphery of the strap structure (5) is attached to a seam area of the second outer panel (35) and the front panel (15).

10. Vehicle safety system for improving the protection of an occupant, comprising an airbag module (1) according to claim 1, an inflator (13), and an electronic control unit, by means of which the inflator (13) can be activated at recognition of an activation situation.

11. Airbag module (1), for a front passenger (21, 23) of a vehicle, comprising:
an inflatable bag (3) comprising a front panel (15) which faces the front passenger (21, 23);
first and second outer panels (33, 35) arranged substantially symmetrically to each other with regard to a vertical middle plane (M) of the inflated bag;
a strap structure (5) located between the first and second outer panels (33, 35) and including a plurality of straps (7) arranged in a ray-like manner with proximal ends (9) connected in a common connection area (13) of the air bag (3) and distal ends (11) connected to the front panel (15);
wherein the distal ends (9) of the straps (7) are connected to the front panel along a continuous seam that extends between the front panel (15) and one of the first and second outer panels (33, 35); and
wherein the strap structure (5) is designed such that the bag is extendable from a first state having a first size to a second state having a second size depending on the size of the respective passenger and/or the severity of an impact.

12. Airbag module according to claim 11, wherein the distal ends (11) of the straps (7) have a geometry configured to extend substantially continuously along a line that extends parallel to the vertical middle plane.

* * * * *